United States Patent
Hara

(10) Patent No.: US 9,665,812 B2
(45) Date of Patent: May 30, 2017

(54) PRINTER WITH PAPER CONVEYANCE CONTROL UPON PAPER JAM

(71) Applicant: RISO KAGAKU CORPORATION, Tokyo (JP)

(72) Inventor: Masashi Hara, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/067,801

(22) Filed: Mar. 11, 2016

(65) Prior Publication Data

US 2016/0275389 A1 Sep. 22, 2016

(30) Foreign Application Priority Data

Mar. 20, 2015 (JP) .................................. 2015-057964

(51) Int. Cl.
*G06K 15/00* (2006.01)
*G06K 15/16* (2006.01)
(Continued)

(52) U.S. Cl.
CPC ......... *G06K 15/4085* (2013.01); *B65H 5/062* (2013.01); *B65H 29/125* (2013.01); *G03G 15/5012* (2013.01); *G06K 15/16* (2013.01); *G06K 15/4025* (2013.01); *B65H 29/58* (2013.01); *B65H 2511/515* (2013.01);
(Continued)

(58) Field of Classification Search
CPC ............... G06K 15/4085; G06K 15/16; G06K 2215/0085; G06K 2215/101; B65H 5/062; B65H 29/58
See application file for complete search history.

(56) References Cited

U.S. PATENT DOCUMENTS

2010/0086338 A1* 4/2010 Hara .................. G03G 15/6561
399/406
2010/0119244 A1* 5/2010 Kitagawa ........... G03G 15/2064
399/21
(Continued)

FOREIGN PATENT DOCUMENTS

JP 2010-131859 6/2010

OTHER PUBLICATIONS

U.S. Appl. No. 14/968,015 to Hara et al., filed Dec. 14, 2015.
U.S. Appl. No. 15/067,761 to Hara, filed Mar. 11, 2016.

*Primary Examiner* — Miya J Williams
(74) *Attorney, Agent, or Firm* — Greenblum & Bernstein, P.L.C.

(57) ABSTRACT

Upon occurrence of a paper jam at a circulation conveyer with a switching direction being set at a paper discharge guiding direction, a controller performs control of maintaining the switching direction at the paper discharge guiding direction and discharging sheets at a section of the circulation conveyer downstream of a position of the paper jam, the printing conveyer, and the paper discharger. Upon occurrence of the paper jam with the switching direction being set at a circulation guiding direction, the controller performs control of switching the switching direction to the paper discharge guiding direction after a sheet passing a switch exits the switch, and discharging the sheets at the section of the circulation conveyer downstream of the position of the paper jam, the printing conveyer, and the paper discharger.

8 Claims, 10 Drawing Sheets

(51) Int. Cl.
  *B65H 5/06*   (2006.01)
  *B65H 29/12*  (2006.01)
  *G03G 15/00*  (2006.01)
  *B65H 29/58*  (2006.01)

(52) U.S. Cl.
  CPC .. *B65H 2511/528* (2013.01); *B65H 2513/511* (2013.01); *B65H 2513/512* (2013.01); *B65H 2601/11* (2013.01); *B65H 2801/06* (2013.01); *G03G 15/70* (2013.01); *G03G 2215/00548* (2013.01); *G03G 2215/00552* (2013.01); *G03G 2215/0141* (2013.01); *G03G 2221/1675* (2013.01); *G06K 2215/0085* (2013.01); *G06K 2215/101* (2013.01)

(56) References Cited

U.S. PATENT DOCUMENTS

| | | | |
|---|---|---|---|
| 2016/0054697 A1* | 2/2016 | Tanaka | G03G 15/6573 399/21 |
| 2016/0089910 A1* | 3/2016 | Iijima | B41J 3/60 347/104 |
| 2016/0185542 A1* | 6/2016 | Inoue | B65H 5/26 271/3.19 |
| 2016/0318728 A1* | 11/2016 | Kowase | B65H 29/60 |
| 2016/0318731 A1* | 11/2016 | Kowase | B65H 43/04 |

\* cited by examiner

PRINTER WITH PAPER CONVEYANCE CONTROL UPON PAPER JAM

CROSS REFERENCE TO RELATED APPLICATION

This application is based upon and claims the benefit of priority from the prior Japanese Patent Application No. 2015-057964, filed on Mar. 20, 2015, the entire contents of which are incorporated herein by reference.

BACKGROUND

1. Technical Field

The disclosure relates to a printer for printing sheets.

2. Related Art

Japanese Unexamined Patent Application Publication No. 2010-131859 proposes a printer which performs printing by simultaneously conveying a plurality of sheets on a conveying route.

When a paper jam occurs in this printer, the paper conveyance stops. Thus, the sheets that are being conveyed at the time of occurrence of the paper jam remain inside the machine. The sheets remaining inside the machine are removed by the user through jam releasing work.

SUMMARY

In the case of the above printer, when the paper conveyance stops due to the occurrence of a paper jam, many sheets may remain inside the machine. Also, depending on where the remaining sheets are present, the work of removing the remaining sheets may be difficult. Thus, the work of removing the remaining sheets may force a great burden on the user.

An object of the disclosure is to provide a printer capable of facilitating the work of removing remaining sheets after the occurrence of a paper jam.

A printer in accordance with some embodiments includes: a printing conveyer configured to convey a sheet in a conveying direction; an image former configured to form an image on the sheet being conveyed by the printing conveyer; a paper discharger configured to discharge the sheet from a downstream end of the printing conveyer in the conveying direction; a circulation conveyer configured to convey the sheet from the downstream end of the printing conveyer to an upstream end of the printing conveyer in the conveying direction; a switch configured to switch a switching direction between a paper discharge guiding direction and a circulation guiding direction, the paper discharge guiding direction being for the sheet to be guided from the printing conveyer to the paper discharger, the circulation guiding direction being for the sheet to be guided from the printing conveyer to the circulation conveyer; and a controller configured to control the printing conveyer, the image former, the paper discharger, the circulation conveyer, and the switch. The controller, upon occurrence of a paper jam at the circulation conveyer with the switching direction being set at the paper discharge guiding direction, drives the switch to maintain the switching direction at the paper discharge guiding direction and drives the circulation conveyer, the printing conveyer, and the paper discharger to discharge sheets at a section of the circulation conveyer downstream of a position of the paper jam, the printing conveyer, and the paper discharger. The controller, upon occurrence of the paper jam at the circulation conveyer with the switching direction being set at the circulation guiding direction, drives the switch to switch the switching direction to the paper discharge guiding direction after a sheet passing the switch exits the switch, and drives the circulation conveyer, the printing conveyer, and the paper discharger to discharge the sheets at the section of the circulation conveyer downstream of the position of the paper jam, the printing conveyer, and the paper discharger.

In the configuration described above, the sheets remaining after the occurrence of a paper jam can be reduced. Also, since no remaining sheet is on the printing conveyer, the printing conveyer does not need to be moved to remove remaining sheets on the printing conveyer. Thus, it is possible to leave a space for the work of removing the remaining sheets from another section. As a result, the work of removing the remaining sheets after the occurrence of the paper jam can be facilitated.

Upon occurrence of the paper jam at the circulation conveyer, the controller may drive the circulation conveyer to stop sheets at a section of the circulation conveyer upstream of the position of the paper jam with an interval between the sheets shorter than an interval between sheets during normal conveyance.

In the configuration described above, the range within which the remaining sheets spread can be narrowed. As a result, the amount of work of removing the remaining sheets can be reduced further.

The printer may further include a paper feeder configured to feed sheets to the circulation conveyer. The controller may be further configured to control the paper feeder. Upon occurrence of a paper jam at the paper feeder with the switching direction being set at the paper discharge guiding direction, the controller may drive the switch to maintain the paper discharge guiding direction and drive the paper feeder, the circulation conveyer, the printing conveyer, and the paper discharger to discharge sheets at a section of the paper feeder downstream of a position of the paper jam, the circulation conveyer, the printing conveyer, and the paper discharger. Upon occurrence of the paper jam at the paper feeder with the switching direction being set at the circulation guiding direction, the controller may drive the switch to switch the switching direction to the paper discharge guiding direction after a sheet passing the switch exits the switch, and drive the paper feeder, the circulation conveyer, the printing conveyer, and the paper discharger to discharge the sheets at the section of the paper feeder downstream of the position of the paper jam, the circulation conveyer, the printing conveyer, and the paper discharger.

In the configuration described above, even when a paper jam occurs at the paper feeder, the work of removing the remaining sheets after the occurrence of the paper jam can be facilitated.

DETAILED DESCRIPTION

Figure 1:
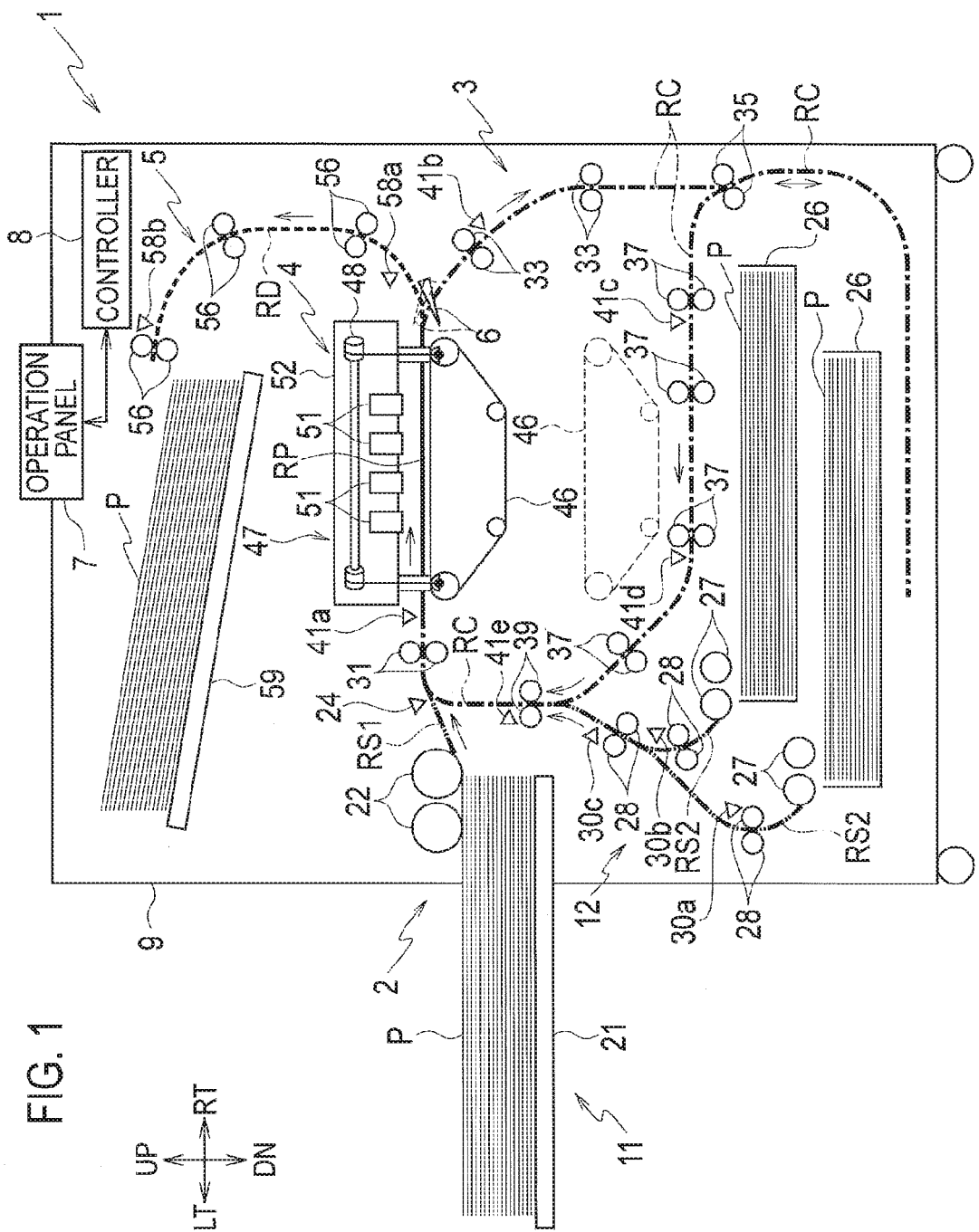
FIG. 1 is a schematic configuration diagram of a printer in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
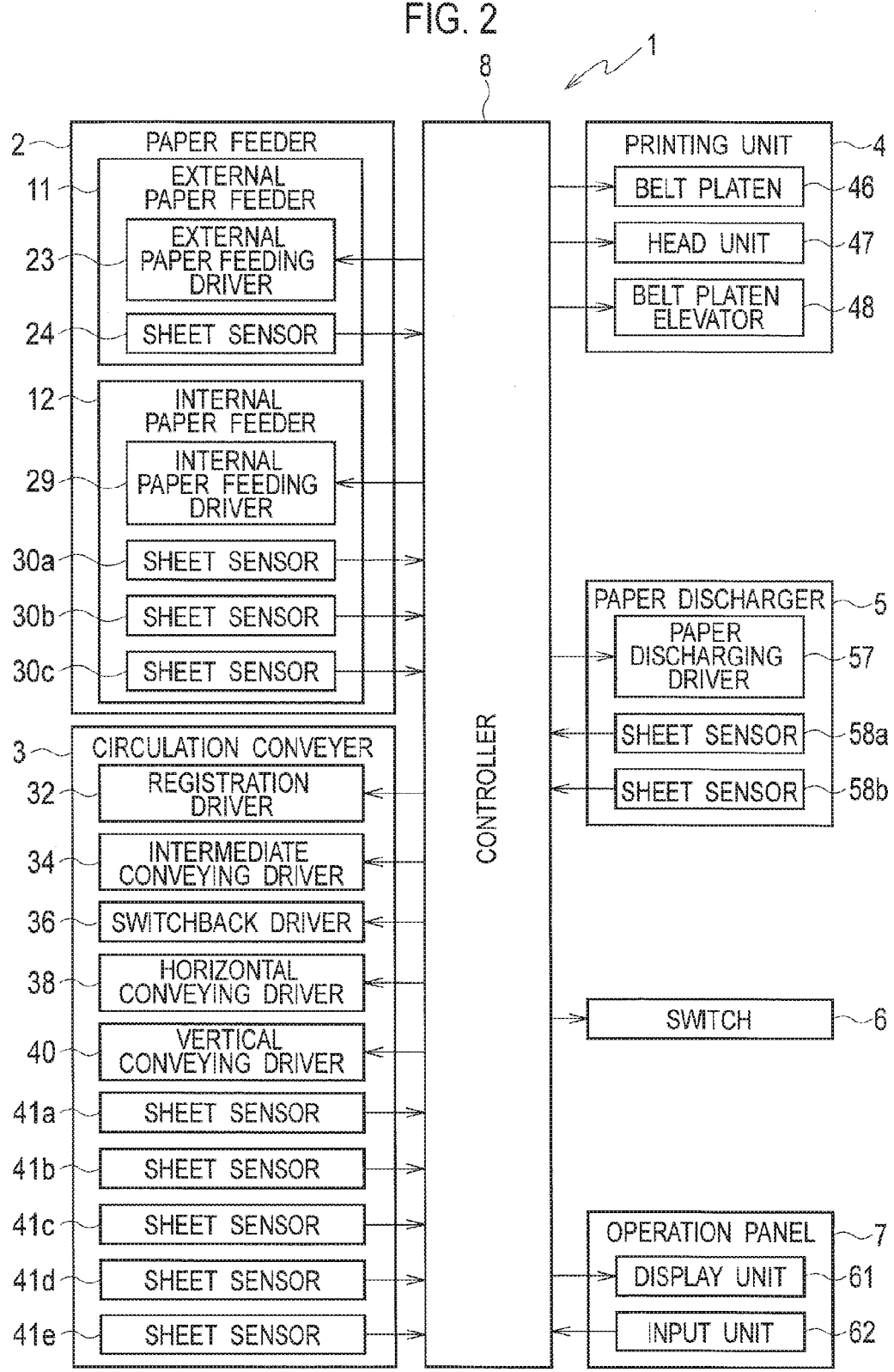
FIG. 2 is a control block diagram of the printer illustrated in FIG. 1.

FIG. 1 is a schematic configuration diagram of a printer 1 in an embodiment. FIG. 2 is a control block diagram of the printer 1 illustrated in FIG. 1. In the following description, the direction perpendicular to the plane of the sheet of FIG. 1 is the front-rear direction, and the foreside of the plane of the sheet is the front side. Also, in FIG. 1 and FIGS. 5 to 15, the directions of right, left, up, and down are denoted by RT, LT, UP, and DN, respectively.

Routes illustrated by bold lines in FIG. 1 are conveying routes through which sheets P being print media are conveyed. Of these conveying routes, a route illustrated by a solid line is a printing route RP, a route illustrated by a one-dot chain line is a circulation route RC, a route illustrated by a broken line is a paper discharging route RD, and routes illustrated by two-dot chain lines are an external paper feeding route RS1 and an internal paper feeding route RS2. In the following description, upstream and downstream mean upstream and downstream in the conveying route.

As illustrated in FIGS. 1 and 2, the printer 1 includes a paper feeder 2, a circulation conveyer 3, a printing unit 4, a paper discharger 5, a switch 6, an operation panel 7, a controller 8, and a case 9 configured to house or hold these components.

The paper feeder 2 is configured to feed sheets to the circulation conveyer 3. The paper feeder 2 includes an external paper feeder 11 and an internal paper feeder 12.

The external paper feeder 11 is configured to feed sheets P loaded in such a way as to be exposed partly to the outside of the case 9. The external paper feeder 11 includes an external paper feed tray 21, external paper feeding rollers 22, an external paper feeding driver 23, and a sheet sensor 24.

The external paper feed tray 21 is a component on which to load sheets P to be used for printing. The external paper feed tray 21 is placed in such a way as to be exposed partly to the outside of the case 9.

The external paper feeding rollers 22 are configured to pick up the sheets P loaded on the external paper feed tray 21 one by one and convey each sheet P to registration rollers 31 to be described later. The external paper feeding route RS1 has its downstream end connected to the circulation route RC between vertical conveying rollers 39 to be described later and the registration rollers 31. Each sheet P picked up by the external paper feeding rollers 22 from the external paper feed tray 21 is sent from the external paper feeding route RS1 to the circulation route RC and then reaches the registration rollers 31.

The external paper feeding driver 23 is configured to rotationally drive the external paper feeding rollers 22. The external paper feeding driver 23 includes a motor.

The sheet sensor 24 is configured to detect the sheet P conveyed along the external paper feeding route RS1. The sheet sensor 24 is also configured to detect a sheet P conveyed along the circulation route RC between the later-described vertical conveying rollers 39 and the registration rollers 31. The sheet sensor 24 is arranged on a downstream section of the external paper feeding route RS1.

The internal paper feeder 12 is configured to feed sheets P loaded inside the case 9. The internal paper feeder 12 includes two internal paper feed trays 26, two pairs of internal paper feeding rollers 27, three pairs of internal paper feeding conveying rollers 28, an internal paper feeding driver 29, and sheet sensors 30a to 30c.

The internal paper feed trays 26 are components on which to load sheets P to be used for printing. The internal paper feed trays 26 are arranged inside the case 9.

The internal paper feeding rollers 27 are configured to pick up the sheets P loaded on the internal paper feed trays 26 one by one.

The internal paper feeding conveying rollers 28 are configured to convey each of the sheets P picked up by the internal paper feeding rollers 27 from the internal paper feed trays 26 to the later-described vertical conveying rollers 39. The internal paper feeding conveying rollers 28 are arranged along the internal paper feeding route RS2. The internal paper feeding route RS2 has its downstream end connected to the circulation route RC between the most downstream ones of horizontal conveying rollers 37 to be described later and the vertical conveying rollers 39. The sheet P conveyed by the internal paper feeding conveying rollers 28 is sent from the internal paper feeding route RS2 to the circulation route RC and then reaches the vertical conveying rollers 39.

The internal paper feeding driver 29 is configured to rotationally drive the internal paper feeding rollers 27 and the internal paper feeding conveying rollers 28. The internal paper feeding driver 29 includes a plurality of motors.

The sheet sensors 30a to 30c are configured to detect the sheets P conveyed along the internal paper feeding route RS2. The sheet sensors 30a to 30c are arranged downstream of and near the three pairs of internal paper feeding conveying rollers 28, respectively.

The circulation conveyer 3 is configured to convey each sheet P fed by the paper feeder 2 to the printing unit 4 along the circulation route RC. The circulation conveyer 3 is also configured to, in duplex printing, convey a sheet P printed on one side along the circulation route RC from the downstream end of a belt platen 46 to be described later through under the belt platen 46 to the upstream end of the belt platen 46. The circulation conveyer 3 includes the registration rollers 31, a registration driver 32, two pairs of intermediate conveying rollers 33, an intermediate conveying driver 34, switchback rollers 35, a switchback driver 36, four pairs of horizontal conveying rollers 37, a horizontal conveying driver 38, the vertical conveying rollers 39, a vertical conveying driver 40, and sheet sensors 41a to 41e.

The registration rollers 31 are configured to convey the sheet P conveyed from the external paper feeding rollers 22 or the vertical conveying rollers 39 to the later-described belt platen 46. The registration rollers 31 are arranged on a downstream end section of the circulation route RC.

The registration driver 32 is configured to rotationally drive the registration rollers 31. The registration driver 32 includes a motor.

The intermediate conveying rollers 33 are configured to, in duplex printing, convey the sheet P printed on one side to the switchback rollers 35. The two pairs of intermediate conveying rollers 33 are arranged along the circulation route RC between the later-described belt platen 46 and the switchback rollers 35.

The intermediate conveying driver 34 is configured to rotationally drive the intermediate conveying rollers 33. The intermediate conveying driver 34 includes a motor.

The switchback rollers 35 are configured to cause the sheet P conveyed by the intermediate conveying rollers 33 to switchback, so that the sheet P is turned upside down. The switchback rollers 35 are arranged along the circulation route RC downstream of the intermediate conveying rollers 33.

The switchback driver 36 is configured to rotationally drive the switchback rollers 35. The switchback driver 36 includes a motor.

The horizontal conveying rollers 37 are configured to convey the sheet P under the belt platen 46 to the vertical conveying rollers 39 after the sheet P is caused to switchback by the switchback rollers 35. The three upstream pairs of horizontal conveying rollers 37 are arranged along a horizontal section of the circulation route RC under the belt platen 46. The most downstream pair of horizontal conveying rollers 37 are arranged along an upward section of the circulation route RC downstream of the horizontal section.

The horizontal conveying driver 38 is configured to rotationally drive the horizontal conveying rollers 37. The horizontal conveying driver 38 includes a plurality of motors.

The vertical conveying rollers 39 are configured to, in duplex printing, convey the sheet P printed on one side and conveyed by the horizontal conveying rollers 37, to the registration rollers 31. The vertical conveying rollers 39 are also configured to convey each unprinted sheet P fed by the internal paper feeder 12 to the registration rollers 31. The vertical conveying rollers 39 are arranged along a vertical section in a downstream region of the circulation route RC.

The vertical conveying driver 40 is configured to rotationally drive the vertical conveying rollers 39. The vertical conveying driver 40 includes a motor.

The sheet sensors 41a to 41e are configured to detect the sheet P conveyed along the circulation route RC. The sheet sensor 41a is arranged downstream of and near the registration rollers 31. The sheet sensor 41b is arranged downstream of and near the upstream intermediate conveying rollers 33. The sheet sensor 41c is arranged downstream of and near the most upstream horizontal conveying rollers 37. The sheet sensor 41d is arranged downstream of and near the third horizontal conveying rollers 37 from the upstream side. The sheet sensor 41e is arranged downstream of and near the vertical conveying rollers 39.

The printing unit 4 is configured to print a sheet P while conveying it. The printing unit 4 is arranged downstream of the registration rollers 31. The printing unit 4 includes the belt platen (printing conveyer) 46, a head unit (image former) 47, and a belt platen elevator 48.

The belt platen 46 is configured to convey the sheet P conveyed by the registration rollers 31 along the printing route RP while attracting and holding the sheet P to and on its belt. Inkjet heads 51 to be described later eject inks onto the sheet P while the sheet P is being conveyed by the belt platen 46, thereby printing an image on the sheet P. In other words, the belt platen 46 conveys the sheet P while the sheet P is being printed.

The belt platen 46 can be moved up and down between a print position and a retreat position by the belt platen elevator 48. The print position is the position of the belt platen 46 at which printing is performed. The print position is the position of the belt platen 46 illustrated in FIG. 1 by a solid line and is near the lower side of the head unit 47. The retreat position is the position of the belt platen 46 to which it is retreated downward from the print position. The retreat position is the position of the belt platen 46 illustrated in FIG. 1 by a broken line.

The head unit 47 is configured to print an image on the sheet P conveyed by the belt platen 46 by ejecting inks onto the sheet P. The head unit 47 includes the plurality of inkjet heads 51 and a head holder 52.

Each inkjet head 51 includes a plurality of nozzles arranged along the front-rear direction (main scanning direction) and is configured to eject an ink through the nozzles. The plurality of inkjet heads 51 are arranged side by side along the direction of conveyance of the sheet P by the belt platen 46 (left-right direction).

The head holder 52 is configured to hold the inkjet heads 51. The head holder 52 is fixed to a predetermined position inside the case 9.

The belt platen elevator 48 is configured to move the belt platen 46 between the print position and the retreat position. The belt platen elevator 48 is arranged inside the head holder 52. The belt platen elevator 48 includes wires, pulleys, a motor, and the like and supports the belt platen 46 in a hanging manner with the wires. The belt platen elevator 48 raises and lowers the belt platen 46 by reeling in and out the wires via rotation of the pulleys with the motor.

The paper discharger 5 is configured to discharge each printed sheet P from the downstream end of the belt platen 46. The paper discharger 5 includes three pairs of paper discharging rollers 56, a paper discharging driver 57, sheet sensors 58a, 58b, and a paper receiving tray 59.

The paper discharging rollers 56 are configured to receive the sheet P conveyed from the belt platen 46 and discharge it onto the paper receiving tray 59. The paper discharging rollers 56 are arranged along the paper discharging route RD, which extends from the downstream end of the printing route RP.

The paper discharging driver 57 is configured to rotationally drive the paper discharging rollers 56. The paper discharging driver 57 includes a motor.

The sheet sensors 58a, 58b are configured to detect the sheet P conveyed along the paper discharging route RD. The sheet sensor 58a is arranged along the paper discharging route RD upstream of the most upstream paper discharging rollers 56. The sheet sensor 58b is arranged near and upstream of the most downstream paper discharging rollers 56.

The paper receiving tray 59 is a component on which to load the sheet P discharged by the paper discharging rollers 56. The paper receiving tray 59 is arranged at the downstream end of the paper discharging route RD.

The switch 6 is configured to switch the destination of conveyance of the sheet P from the belt platen 46 between the paper discharger 5 and the circulation conveyer 3. The switch 6 is arranged at a point which is the downstream end of the printing route RP and the upstream ends of the circulation route RC and the paper discharging route RD. The switch 6 is capable of switching its direction between a paper discharge guiding direction and a circulation guiding direction. The paper discharge guiding direction is a direction in which the sheet P is guided from the belt platen 46 to the paper discharger 5. The paper discharge guiding direction is the direction of the switch 6 illustrated in FIG. 1 by a solid line. The circulation guiding direction is a direction in which the sheet P is guided from the belt platen 46 to the circulation conveyer 3. The circulation guiding direction is the direction of the switch 6 illustrated in FIG. 1 by a broken line.

The operation panel 7 is configured to display various input windows and the like and receive input operations from the user. The operation panel 7 includes a display unit 61 and an input unit 62.

The display unit 61 is configured to display the various input windows and the like. The display unit 61 includes a liquid crystal display panel and the like.

The input unit 62 is configured to receive input operations from the user and output operation signals corresponding to the operations. The input unit 62 includes various operation keys, a touchscreen, and the like.

The controller 8 is configured to control the operation of given components of the printer 1. The controller 8 includes a CPU, a RAM, a ROM, a hard disk drive, and the like as its constituent components.

In performing printing operation, the controller 8 performs control to feed a sheet P with the paper feeder 2, print the sheet P by ejecting the inks with the head unit 47 while conveying the sheet P with the circulation conveyer 3 and the belt platen 46, and discharge the printed sheet P with the paper discharger 5. During the printing operation, the controller 8 determines whether or not a paper jam has occurred, based on the timings of sheet detection by the sheet sensors 24, 30a to 30c, 41a to 41e, 58a, 58b. The controller 8 executes a paper jam handling process to be described layer if determining that a paper jam has occurred.

Next, the operation of the printer 1 will be described.

Upon input of a print job, the controller 8 executes printing operation. Here, the controller 8 acquires simplex/duplex printing setting information contained in the print job and executes simplex printing or duplex printing in accordance with the content of this information.

First, the simplex printing will be described. Upon start of simplex printing operation, the controller 8 controls the paper feeder 2 to sequentially feed unprinted sheets P from the external paper feeder 11 or the internal paper feeder 12 to the circulation conveyer 3.

Here, in the case of feeding sheets P from the external paper feeder 11, the controller 8 performs control such that the sheets P fed from the external paper feeder 11 are conveyed onto the belt platen 46 by the registration rollers 31. The controller 8 controls the external paper feeder 11 and the registration rollers 31 to sequentially send the sheets P onto the belt platen 46 at such timings that the sheets P are conveyed with a predetermined sheet interval therebetween on the belt platen 46. The sheet interval is the interval between the trailing end of a preceding sheet P and the leading end of the following sheet P.

In the case of feeding sheets P from the internal paper feeder 12, the controller 8 performs control such that the sheets P fed from the internal paper feeder 12 are conveyed to the registration rollers 31 by the vertical conveying rollers 39 and conveyed onto the belt platen 46 by the registration rollers 31. The controller 8 controls the internal paper feeder 12, the vertical conveying rollers 39, and the registration rollers 31 to sequentially send the sheets P onto the belt platen 46 at such timings that the sheets P are conveyed with the predetermined sheet interval therebetween on the belt platen 46.

Each sheet P sent onto the belt platen 46 is printed with the inks ejected from the inkjet heads 51 while being conveyed by the belt platen 46 at a predetermined printing conveying speed. The printed sheet P is guided to the paper discharging route RD by the switch 6 oriented in the paper discharge guiding direction, conveyed by the paper discharging rollers 56, and then discharged onto the paper receiving tray 59.

Next, the duplex printing will be described. In the duplex printing, the controller 8 controls the paper feeder 2 to sequentially feed unprinted sheets P at such timings that the length of time between the timings of feed of two sheets P can be twice longer than that in the simplex printing. As a result, in the duplex printing, the interval between the timings at which two sheets to reach the registration rollers 31 is twice longer than that in the simplex printing.

Each unprinted sheet P sent onto the belt platen 46 is printed while being conveyed by the belt platen 46. The sheet P printed on one side is guided to the circulation route RC by the switch 6 oriented in the circulation guiding direction, and then conveyed to the switchback rollers 35 by the intermediate conveying rollers 33. The sheet P is caused to switchback by the switchback rollers 35. Thereafter, the sheet P is conveyed to the registration rollers 31 by the horizontal conveying rollers 37 and the vertical conveying rollers 39. The sheet P is then sent onto the belt platen 46 by the registration rollers 31 again.

Here, the sheet P printed on one side is conveyed to the registration rollers 31 at such a timing that the sheet P printed on one side and sequentially fed unprinted sheets P are sent alternately onto the belt platen 46. As mentioned above, in the duplex printing, the interval between the timings at which two sheets sequentially fed from the paper feeder 2 reach the registration rollers 31 is twice longer than that in the simplex printing. Hence, the sheet P printed on one side can be introduced between unprinted sheets P and sent onto the belt platen 46 alternately with the feed of the unprinted sheets P.

The sheet P printed on one side is sent onto the belt platen 46 with its unprinted side facing up since the sheet P has been caused to switchback by the switchback rollers 35. The sheet P printed on one side is printed on the unprinted side while being conveyed by the belt platen 46. The sheet P printed on both sides is then guided to the paper discharging route RD by the switch 6 oriented in the paper discharge guiding direction, conveyed by the paper discharging rollers 56, and discharged onto the paper receiving tray 59.

As described above, in the duplex printing, a sheet P printed on one side is sent onto the belt platen 46 alternately with the feed of unprinted sheets P, so that the printing of one side of the unprinted sheets P and the printing of the unprinted side of the sheet P printed on one side are performed alternately on the belt platen 46. In this way, the duplex printing is performed with the same productivity per side as the simplex printing.

During this duplex printing, the controller 8 controls the switch 6 to switch its direction alternately between the circulation guiding direction and the paper discharge guiding direction. As a result, of the sheets P conveyed from the belt platen 46 to the switch 6, the sheet P printed on one side is guided to the circulation conveyer 3 whereas the sheet P printed on both sides is guided to the paper discharger 5. The controller 8 switches the direction of the switch 6 based on a theoretical value of the timing at which the trailing end of a sheet P exits the switch 6. The switching of the direction of the switch 6 is done within a period after the trailing end of a sheet P passes the switch 6 but before the leading end of the next sheet P reaches the switch 6.

Since every other sheet P reaching the switch 6 is guided to the circulation conveyer 3, the sheets P are conveyed with one sheet absent therebetween at the circulation conveyer 3. Thus, at the circulation conveyer 3, the sheets P are conveyed with an interval therebetween longer than the length of a sheet.

During the simplex printing or duplex printing operation described above, the controller 8 determines whether or not a paper jam has occurred. Specifically, the controller 8 determines that a paper jam has occurred, if the timing of detection of a sheet P by any of the sheet sensors 24, 30*a* to 30*c*, 41*a* to 41*e*, 58*a*, 58*b* is delayed from the corresponding theoretical value by a threshold value or greater. If determining that a paper jam has occurred, the controller 8 executes the paper jam handling process.

Figure 3:
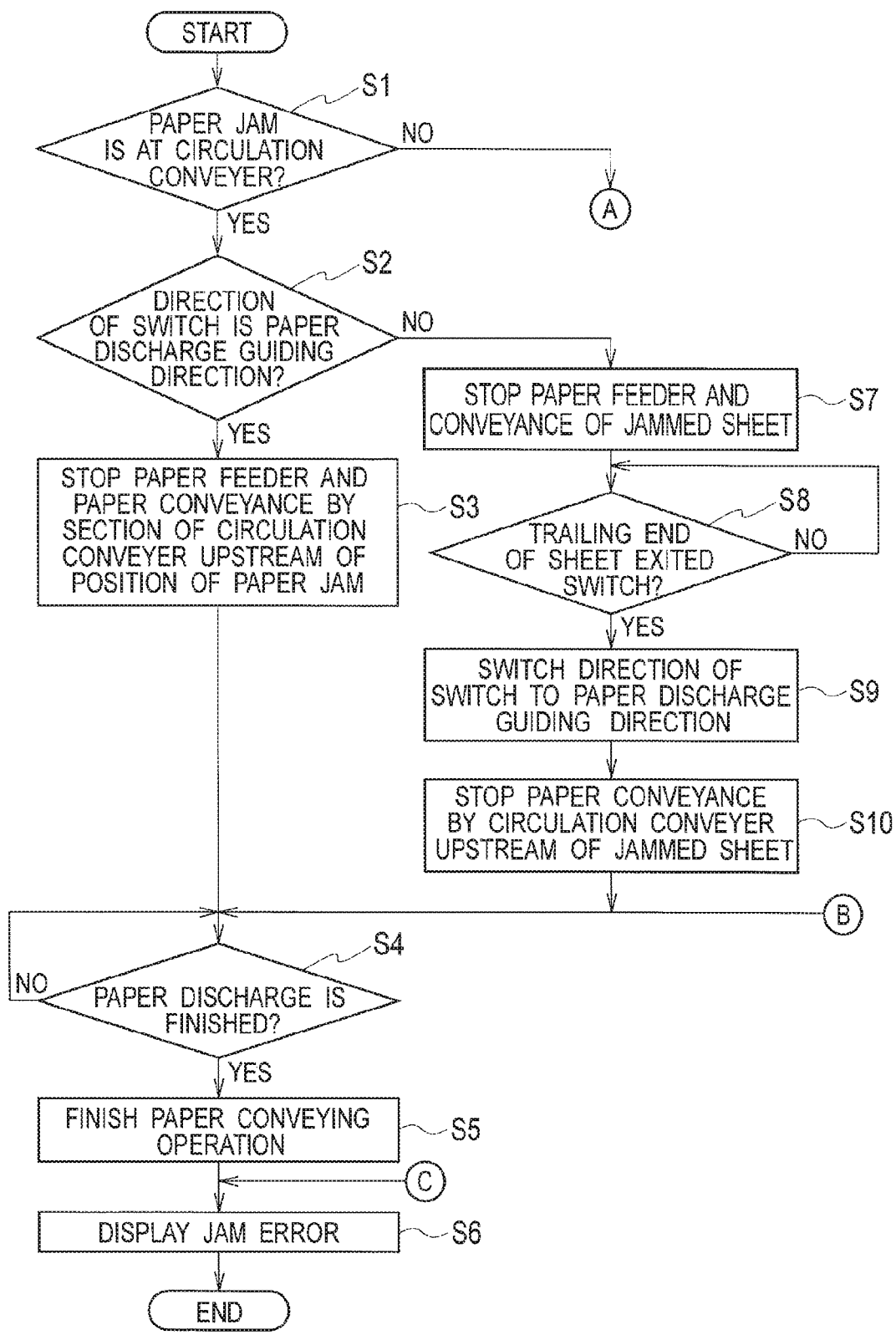
FIG. 3 is a flowchart of a paper jam handling process.
Figure 4:
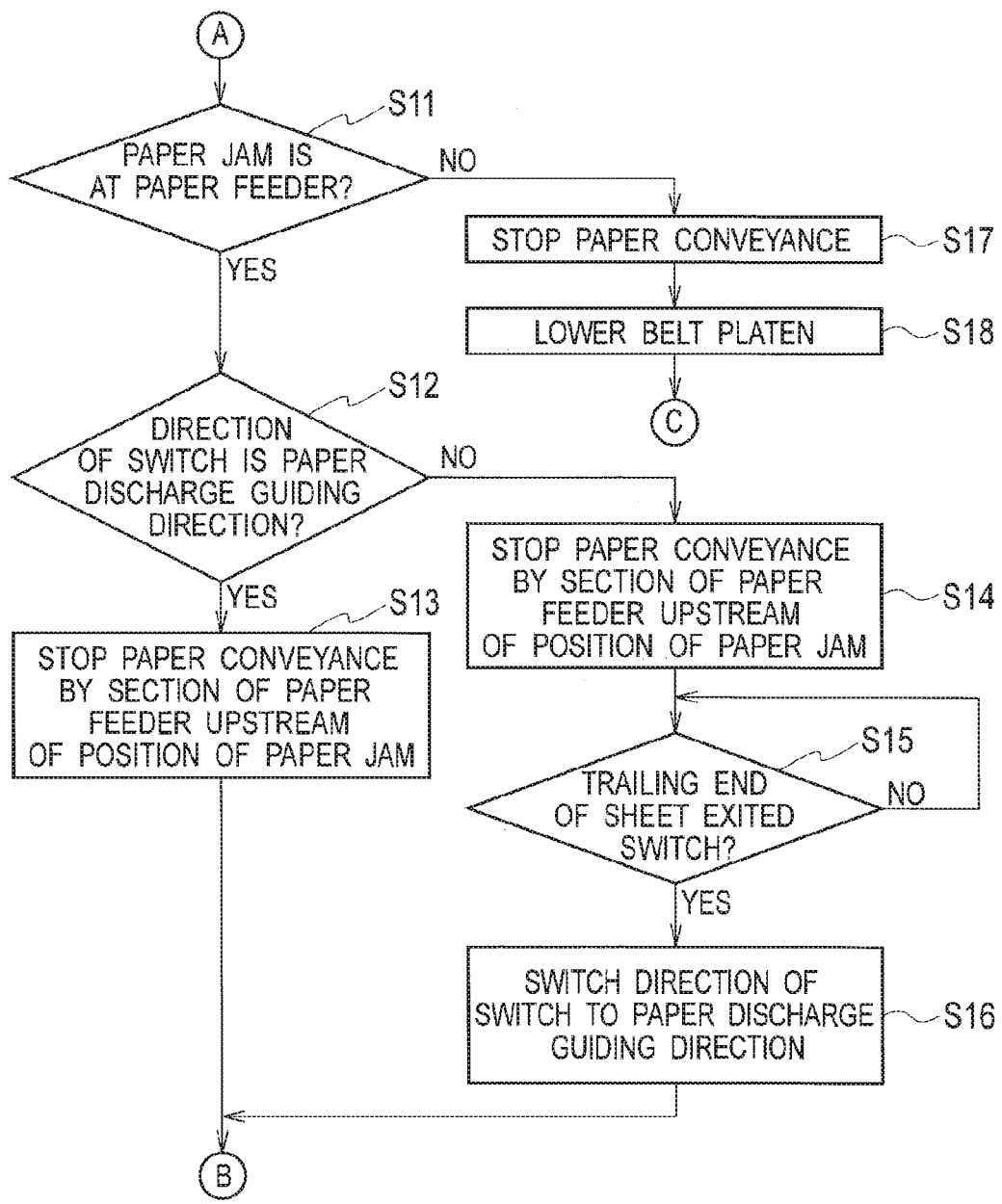
FIG. 4 is a flowchart of the paper jam handling process.

The paper jam handling process will now be described. FIGS. 3 and 4 are flowcharts of the paper jam handling process. The process in the flowcharts in FIGS. 3 and 4 starts when it is determined that a paper jam has occurred.

In Step S1 in FIG. 3, the controller 8 determines whether or not the occurred paper jam is a paper jam at the circulation conveyer 3.

Here, the controller 8 determines that the paper jam is a paper jam at the circulation conveyer 3 if the paper jam is detected by any of the sheet sensors 41*a* to 41*e* of the circulation conveyer 3. Also, the controller 8 determines that the paper jam is a paper jam at the circulation conveyer 3 if a sheet P conveyed along the circulation route RC is detected to have jammed by the sheet sensor 24. Note that the sheet P passing the position of detection by the sheet sensor 24 on the circulation route RC is an unprinted sheet P fed from the internal paper feeder 12 or a sheet P printed on one side and conveyed by the circulation conveyer 3.

If determining that the occurred paper jam is a paper jam at the circulation conveyer 3 (Step S1: YES), the controller 8 determines in Step S2 whether or not the direction of the switch 6 at the time of occurrence of the paper jam is the paper discharge guiding direction.

Here, in the case of the duplex printing, if a paper jam occurs while a sheet P printed on both sides is being guided from the belt platen 46 toward the paper discharger 5 and passing the switch 6, the direction of the switch 6 at the time of occurrence of the paper jam is the paper discharge guiding direction. In the case of the simplex printing, the direction of the switch 6 is always the paper discharge guiding direction during the printing operation, and the direction of the switch 6 at the time of occurrence of the paper jam is therefore the paper discharge guiding direction.

The controller 8 holds information indicating the direction of the switch 6 during the printing operation and determines the direction of the switch 6 at the time of occurrence of the paper jam based on that information. Note that a sensor configured to detect the direction of the switch 6 may be provided and the controller 8 may determine the direction of the switch 6 at the time of occurrence of the paper jam based on the result of detection by that sensor.

If determining that the direction of the switch 6 at the time of occurrence of the paper jam is the paper discharge guiding direction (Step S2: YES), the controller 8 stops the paper feeder 2 (external paper feeder 11 or internal paper feeder 12) in Step S3. At the same time, the controller 8 stops the paper conveyance by the section of the circulation conveyer 3 upstream of the position of the paper jam.

Here, the controller 8 maintains the switch 6 in the paper discharge guiding direction and continues the paper conveyance by the section of the circulation conveyer 3 downstream of the position of the paper jam, the belt platen 46, and the paper discharger 5. As a result, the sheets P at these sections are discharged.

Then, in Step S4, the controller 8 determines whether or not the discharge of the sheets P at the section of the circulation conveyer 3 downstream of the position of the paper jam, the belt platen 46, and the paper discharger 5 has finished. Here, the controller 8 determines whether or not the discharge of the sheets P has finished, based on the detection signal from the sheet sensor 58*b*. The controller 8 repeats Step S4 if determining that the discharge of the sheets P has not finished (Step S4: NO).

If determining that the discharge of the sheets P has finished (Step S4: YES), the controller 8 in Step S5 finishes the paper conveying operation of the sections which have continued their paper conveyance. As a result, the paper conveyance is stopped with no remaining sheets at the belt platen 46 and the paper discharger 5.

Then, in Step S6, the controller 8 displays the jam error on the display unit 61. Specifically, the controller 8 causes the display unit 61 to display a jam error window which notifies the user of the occurrence of the paper jam and prompts the user to perform paper jam releasing work. By this step, the paper jam handling process ends.

On the jam error window, a procedure to remove the remaining sheets on the conveying route(s) is displayed. The user can release the paper jam by checking the jam error window and removing the remaining sheets out of the printer 1.

If determining in Step S2 that the direction of the switch 6 is the circulation guiding direction (Step S2: NO), the controller 8 stops the paper feeder 2 in Step S7. Also, the controller 8 stops the conveyance of the jammed sheet at the circulation conveyer 3. The jammed sheet is the sheet P which has jammed. The jammed sheet is the most downstream sheet among the sheets upstream of the sheet sensor which has detected the paper jam. The controller 8 continues the conveyance of the sheets P at the circulation conveyer 3 upstream of the jammed sheet. Also, the controller 8 continues the paper conveyance by the section of the circulation conveyer 3 downstream of the position of the paper jam, the belt platen 46, and the paper discharger 5 as well.

Then, in Step S8, the controller 8 determines whether or not the trailing end of the sheet P passing the switch 6 at the time of occurrence of the paper jam has exited the switch 6. Here, the controller 8 determines whether or not the trailing end of the sheet P passing the switch 6 has exited the switch 6, based on the theoretical value of the timing at which the trailing end of this sheet P exits the switch 6. The controller 8 repeats Step S8 if determining that the trailing end of the sheet P passing the switch 6 has not exited the switch 6 (Step S8: NO).

If determining that the trailing end of the sheet P passing the switch 6 at the time of occurrence of the paper jam has exited the switch 6 (Step S8: YES), the controller 8 switches the direction of the switch 6 to the paper discharge guiding direction in Step S9. Thereafter, the controller 8 maintains the switch 6 in the paper discharge guiding direction.

Then, in Step S10, the controller 8 stops the paper conveyance by the circulation conveyer 3 upstream of the jammed sheet. The controller 8 continues the paper conveyance by the section of the circulation conveyer 3 downstream of the position of the paper jam, the belt platen 46, and the paper discharger 5. As a result, the sheets P at these sections are discharged.

Then, the controller 8 proceeds to Step S4 and executes the subsequent part of the process. As a result, the paper conveyance is stopped with no remaining sheets at the belt platen 46 and the paper discharger 5. Thereafter, the jam error is displayed and the paper jam handling process ends.

If determining in Step S1 that the occurred paper jam is not a paper jam at the circulation conveyer 3 (Step S1: NO), the controller 8 determines in Step S11 in FIG. 4 whether or not the occurred paper jam is a paper jam at the paper feeder 2.

Here, the controller 8 determines that the occurred paper jam is a paper jam at the paper feeder 2, if determining that the paper jam has occurred at the external paper feeder 11 or the internal paper feeder 12 which is used for the paper feed. The controller 8 determines that the paper jam has occurred at the external paper feeder 11, if a sheet P conveyed along the external paper feeding route RS1 is detected to have jammed by the sheet sensor 24 of the external paper feeder 11. On the other hand, the controller 8 determines that the paper jam has occurred at the internal paper feeder 12, if the paper jam is detected by any of the sheet sensors 30a to 30c of the internal paper feeder 12.

If determining that the occurred paper jam is a paper jam at the paper feeder 2 (Step S11: YES), the controller 8 determines in Step S12 whether or not the direction of the switch 6 at the time of occurrence of the paper jam is the paper discharge guiding direction.

If determining that the direction of the switch 6 at the time of occurrence of the paper jam is the paper discharge guiding direction (Step S12: YES), the controller 8 in Step S13 stops the paper conveyance by the section of the paper feeder 2 upstream of the position of the paper jam.

Here, the controller 8 maintains the switch 6 in the paper discharge guiding direction and continues the paper conveyance by the section of the paper feeder 2 downstream of the position of the paper jam, the circulation conveyer 3, the belt platen 46, and the paper discharger 5. As a result, the sheets P at these sections are discharged.

Then, the controller 8 proceeds to Step S4 in FIG. 3 and executes the subsequent part of the process. As a result, the paper conveyance is stopped with no remaining sheets at the circulation conveyer 3, the belt platen 46, and the paper discharger 5. Thereafter, the jam error is displayed and the paper jam handling process ends.

If determining in Step S12 that the direction of the switch 6 is the circulation guiding direction (Step S12: NO), the controller 8 in Step S14 stops the paper conveyance by the section of the paper feeder 2 upstream of the position of the paper jam. The controller 8 continues the paper conveyance by the section of the paper feeder 2 downstream of the position of the paper jam, the circulation conveyer 3, the belt platen 46, and the paper discharger 5.

Then, in Step S15, the controller 8 determines whether or not the trailing end of the sheet P passing the switch 6 at the time of occurrence of the paper jam has exited the switch 6. The controller 8 repeats Step S15 if determining that the trailing end of that sheet P has not exited the switch 6 (Step S15: NO).

If determining that the trailing end of the sheet P passing the switch 6 at the time of occurrence of the paper jam has exited the switch 6 (Step S15: YES), the controller 8 switches the direction of the switch 6 to the paper discharge guiding direction in Step S16. Thereafter, the controller 8 maintains the switch 6 in the paper discharge guiding direction. As a result, the sheets P at the section of the paper feeder 2 downstream of the position of the paper jam, the circulation conveyer 3, the belt platen 46, and the paper discharger 5 are discharged.

Then, the controller 8 proceeds to Step S4 in FIG. 3 and executes the subsequent part of the process. As a result, the paper conveyance is stopped with no remaining sheets at the circulation conveyer 3, the belt platen 46, and the paper discharger 5. Thereafter, the jam error is displayed and the paper jam handling process ends.

If determining in Step S11 that the occurred paper jam is not a paper jam at the paper feeder 2 (Step S11: NO), the controller 8 stops the paper conveyance in the entire printer 1 in Step S17. Specifically, the controller 8 stops the paper conveyance by the paper feeder 2, the circulation conveyer 3, the belt platen 46, and the paper discharger 5.

Here, "NO" in Step S11 means that the occurred paper jam is neither a paper jam at the circulation conveyer 3 nor a paper jam at the paper feeder 2. If the occurred paper jam is neither a paper jam at the circulation conveyer 3 nor a paper jam at the paper feeder 2, then the occurred paper jam is a paper jam at the paper discharger 5. The controller 8 determines that the occurred paper jam is a paper jam at the paper discharger 5 if the paper jam is detected by any of the sheet sensors 58a, 58b of the paper discharger 5.

With the paper jam occurring at the paper discharger 5, the paper conveyance is stopped in Step S17. As a result, sheets P remain at the belt platen 46.

Then, in Step S18, the controller 8 lowers the belt platen 46 to the retreat position, thereby leaving a work space between the belt platen 46 and the head unit 47 for removing the remaining sheets from the belt platen 46. Thereafter, the controller 8 proceeds to Step S6 in FIG. 3 and displays the jam error. By this step, the paper jam handling process ends.

Note that there is a case where, when a paper jam occurs, the direction of the switch 6 is the circulation guiding direction and the sheet P passing the switch 6 is the jammed sheet. In this case, the sheet P passing the switch 6 cannot be moved and thus the switch 6 cannot be switched to the paper discharge guiding direction. Thus, the sheets P upstream of the switch 6 cannot be discharged. For this reason, when the above paper jam occurs, the controller 8 stops the paper conveyance by the sections other than the paper discharger 5 and displays the jam error. In this case, sheets P remains at the belt platen 46, and the controller 8 thus lowers the belt platen 46 to the retreat position, thereby leaving a work space between the belt platen 46 and the head unit 47 for removing the remaining sheets from the belt platen 46.

Next, the paper jam handling process will be described using specific examples.

First, as a first specific example, description will be given of one example of the paper jam handling process performed in a case where the direction of the switch 6 is the paper discharge guiding direction at the time of occurrence of a paper jam at the circulation conveyer 3.

Figure 5:
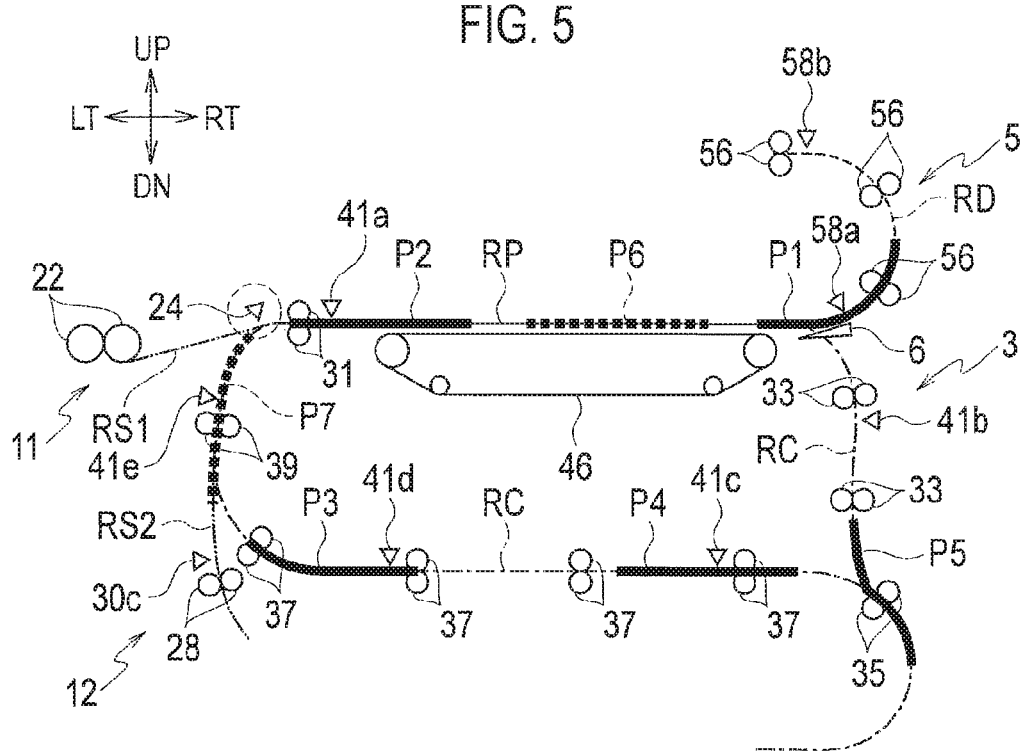
FIG. 5 is a diagram illustrating the positions of sheets at the time of occurrence of a paper jam in a first specific example.

FIG. 5 is a diagram illustrating the positions of sheets at the time of occurrence of the paper jam in the first specific example. In the example in FIG. 5, the paper jam is detected by the sheet sensor 24 during duplex printing operation involving feeding sheets from the internal paper feeder 12.

In FIG. 5, sheets P1 to P5 illustrated by bold solid lines are sheets which have been sequentially fed from the internal paper feeder 12, printed on one side, and passed the switch 6 to be guided to the circulation conveyer 3. Among them, the sheet P1 has been printed on both sides and is passing the switch 6 oriented in the paper discharge guiding direction. Sheets P6, P7 illustrated by bold broken lines are sheets which have never passed the switch 6. The sheet P6 is a sheet fed between the sheet P1 and the sheet P2, each of which has been printed on one side. The sheet P7 is a sheet fed between the sheet P2 and the sheet P3, each of which has been printed on one side.

Determining that the paper jam has occurred in the state in FIG. 5, the controller 8 performs control to stop the paper conveyance by the section of the circulation conveyer 3 upstream of the sheet sensor 24, or the position of the paper jam (Step S3 in FIG. 3). Also, the controller 8 stops the operation of the internal paper feeder 12 (Step S3 in FIG. 3).

Further, the controller 8 performs control to maintain the switch 6 in the paper discharge guiding direction and to continue the paper conveyance by the section of the circulation conveyer 3 downstream of the sheet sensor 24 (registration rollers 31), the belt platen 46, and the paper discharger 5. As a result, the sheets P1, P6, P2 are discharged. Once the discharge of the sheet P1, P6, P2 finishes (Step S4: YES), the controller 8 finishes the paper conveying operation of the sections which have continued their paper conveyance (Step S5 in FIG. 3).

Figure 6:
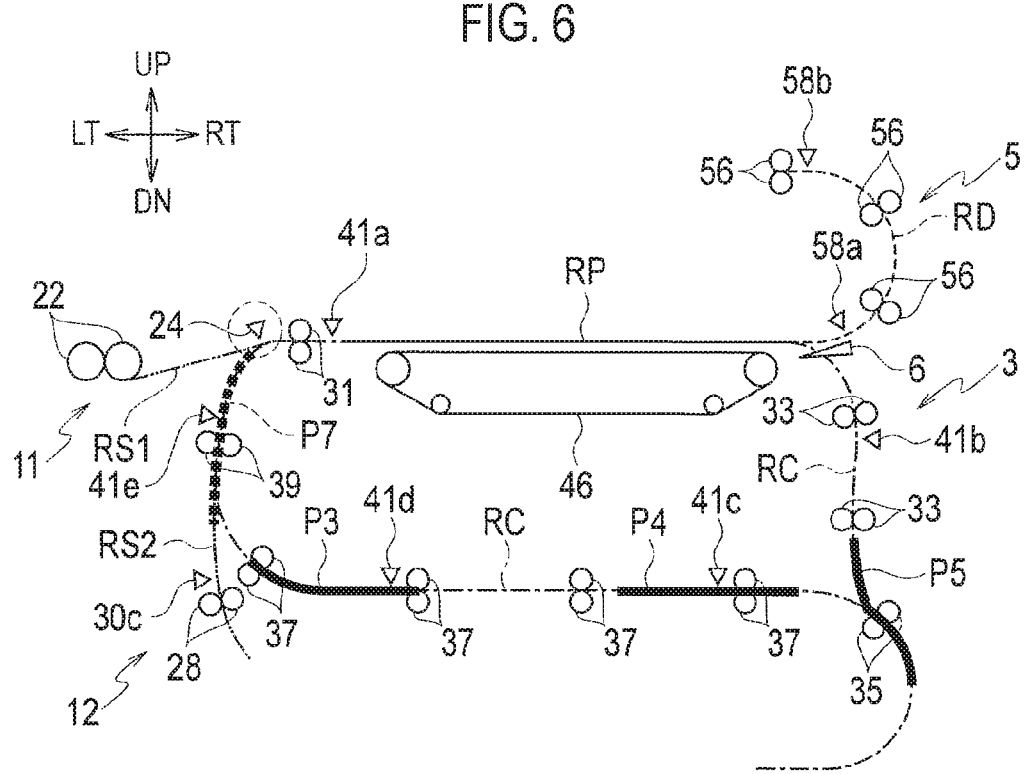
FIG. 6 is a diagram illustrating the positions of the sheets after the paper jam handling process in the first specific example.

As a result, the paper conveyance is stopped in a state illustrated in FIG. 6. Since the sheets P1, P6, P2 are discharged, the remaining sheets are reduced as compared to a case where the paper conveyance is entirely stopped in the state in FIG. 5 at the time of occurrence of the paper jam. Also, since no remaining sheet is on the belt platen 46, the belt platen 46 does not need to be lowered for the jam releasing work. Thus, it is possible to leave a space for the work of removing the remaining sheets from the horizontal conveying section of the circulation conveyer 3.

Next, as a second specific example, description will be given of another example of the paper jam handling process performed in the case where the direction of the switch 6 is the paper discharge guiding direction at the time of occurrence of a paper jam at the circulation conveyer 3.

Figure 7:
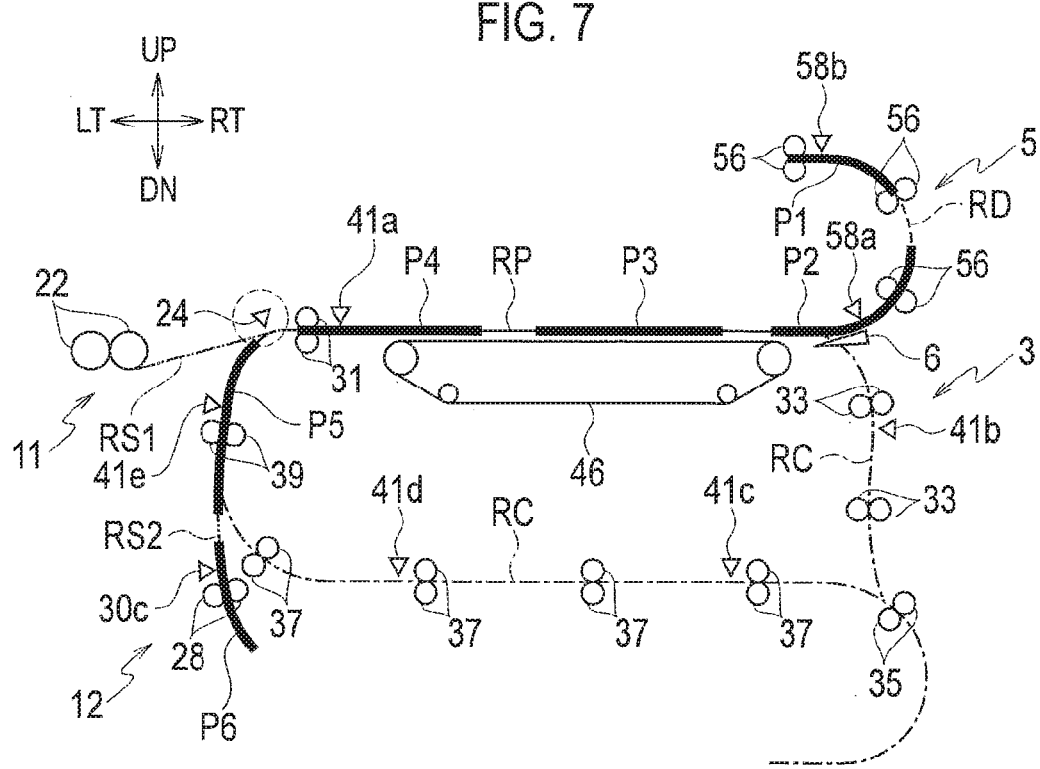
FIG. 7 is a diagram illustrating the positions of sheets at the time of occurrence of a paper jam in a second specific example.

FIG. 7 is a diagram illustrating the positions of sheets at the time of occurrence of the paper jam in the second specific example. In the example in FIG. 7, the paper jam is detected by the sheet sensor 24 during simplex printing operation involving feeding sheets from the internal paper feeder 12.

In FIG. 7, sheets P1, P2, . . . are sheets to be discharged after being sequentially fed from the internal paper feeder 12, printed on one side while being conveyed by the belt platen 46, and guided by the switch 6 set in the paper discharge guiding direction to the paper discharger 5.

Determining that the paper jam has occurred in the state in FIG. 7, the controller 8 performs control to stop the paper conveyance by the section of the circulation conveyer 3 upstream of the sheet sensor 24, or the position of the paper jam (Step S3 in FIG. 3). Also, the controller 8 stops the operation of the internal paper feeder 12 (Step S3 in FIG. 3).

Further, the controller 8 performs control to maintain the switch 6 in the paper discharge guiding direction and to continue the paper conveyance by the section of the circulation conveyer 3 downstream of the sheet sensor 24 (registration rollers 31), the belt platen 46, and the paper discharger 5. As a result, the sheets P1 to P4 are discharged. Once the discharge of the sheets P1 to P4 finishes (Step S4 in FIG. 3: YES), the controller 8 finishes the paper conveying operation of the sections which have continued their paper conveyance (Step S5 in FIG. 3).

Figure 8:
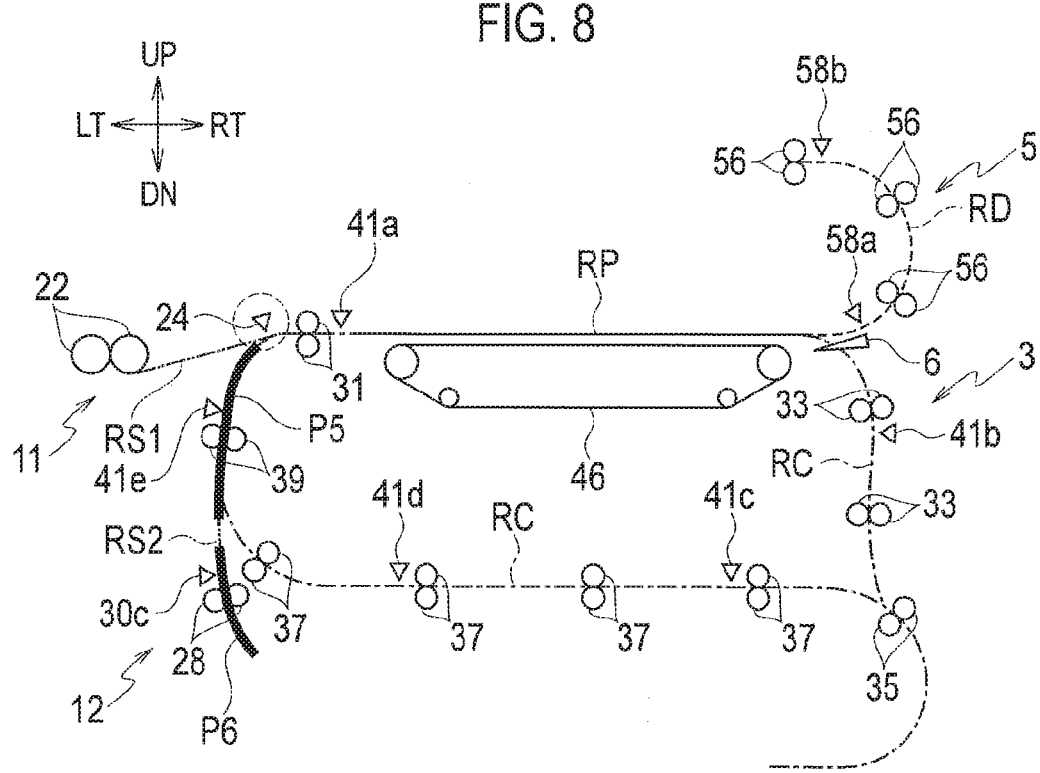
FIG. 8 is a diagram illustrating the positions of the sheets after the paper jam handling process in the second specific example.

As a result, the paper conveyance is stopped in a state illustrated in FIG. 8. Since the sheets P1 to P4 are discharged, the remaining sheets are reduced as compared to a case where the paper conveyance is entirely stopped in the state in FIG. 7 at the time of occurrence of the paper jam. Also, since no remaining sheet is on the belt platen 46, the belt platen 46 does not need to be lowered for the jam releasing work.

Next, as a third specific example, description will be given of one example of the paper jam handling process performed in a case where the direction of the switch 6 is the circulation guiding direction at the time of occurrence of a paper jam at the circulation conveyer 3.

Figure 9:
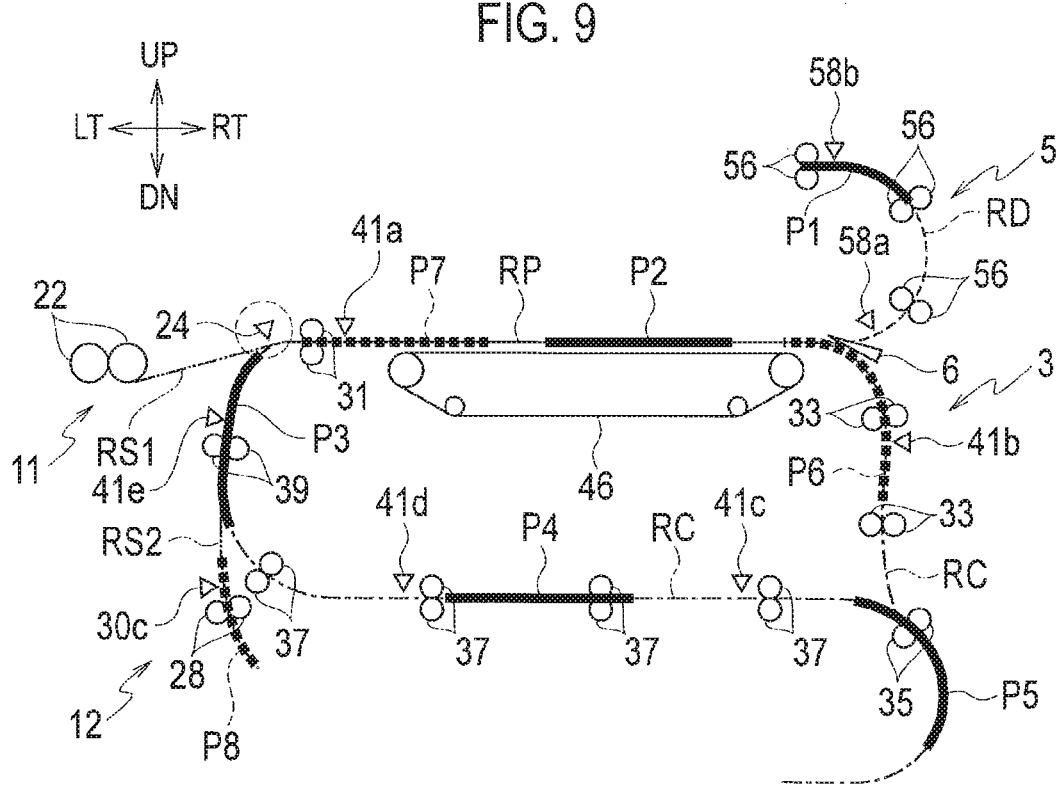
FIG. 9 is a diagram illustrating the positions of sheets at the time of occurrence of a paper jam in a third specific example.

FIG. 9 is a diagram illustrating the positions of sheets at the time of occurrence of the paper jam in the third specific example. In the example in FIG. 9, the paper jam is detected by the sheet sensor 24 during duplex printing operation involving feeding sheets from the internal paper feeder 12.

In FIG. 9, as in the example in FIG. 5, sheets P1 to P5 are sheets which have been sequentially fed from the internal paper feeder 12, printed on one side, and passed the switch 6 to be guided to the circulation conveyer 3. Among them, the sheet P1 has been printed on both sides and guided to the paper discharger 5 by the switch 6. A sheet P6 is a sheet fed between the sheet P1 and the sheet P2, each of which has been printed on one side, from the internal paper feeder 12. The sheet P6 has been printed on one side and is passing the switch 6 oriented in the circulation guiding direction. A sheet P7 is a sheet fed between the sheet P2 and the sheet P3, each of which has been printed on one side. A sheet P8 is a sheet to be fed between the sheet P3 and the sheet P4, each of which has been printed on one side.

Determining that the paper jam has occurred in the state in FIG. 9, the controller 8 stops the operation of the internal paper feeder 12. Also, the controller 8 stops the conveyance of the sheet P3, which is the jammed sheet, by stopping the vertical conveying rollers 39 (Step S7 in FIG. 3). The controller 8 continues to the paper conveyance by the other sections. Then, the controller 8 switches the direction of the switch 6 to the paper discharge guiding direction once the trailing end of the sheet P6 exits the switch 6 (Step S8 in FIG. 3: YES). Thereafter, the controller 8 performs control to stop the paper conveyance by the circulation conveyer 3 upstream of the sheet P3 (Step S9 in FIG. 3). Specifically, the controller 8 stops the intermediate conveying rollers 33, the switchback rollers 35, and the horizontal conveying rollers 37.

Also, the controller 8 performs control to maintain the switch 6 in the paper discharge guiding direction and to continue the paper conveyance by the section of the circulation conveyer 3 downstream of the sheet sensor 24 (registration rollers 31), the belt platen 46, and the paper discharger 5. As a result, the sheets P1, P2, P7 are discharged. Once the discharge of the sheets P1, P2, P7 finishes (Step S4 in FIG. 3: YES), the controller 8 finishes the paper conveying operation of the sections which have continued their paper conveyance (Step S5 in FIG. 3).

Figure 10:
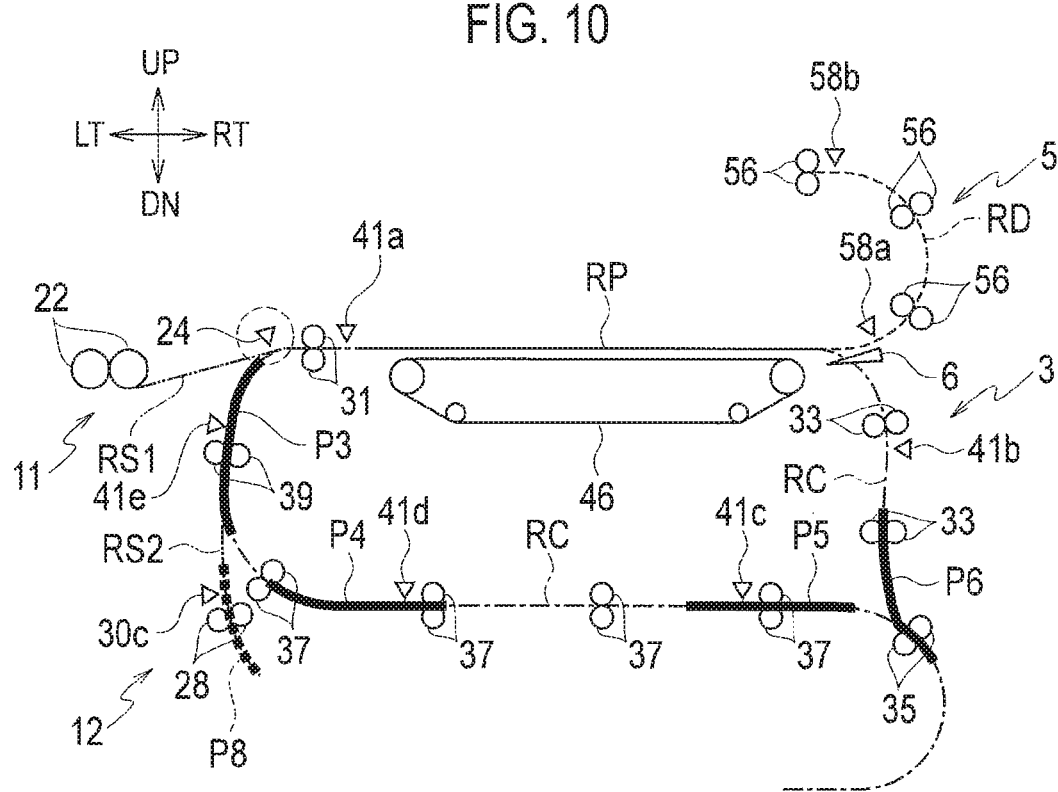
FIG. 10 is a diagram illustrating the positions of the sheets after the paper jam handling process in the third specific example.

As a result, the paper conveyance is stopped in a state illustrated in FIG. 10. Since the sheets P1, P2, P7 are discharged, the remaining sheets are reduced as compared to a case where the paper conveyance is stopped in the state in FIG. 9 at the time of occurrence of the paper jam. Also, since no remaining sheet is on the belt platen 46, the belt platen 46 does not need to be lowered for the jam releasing work. Thus, it is possible to leave a space for the work of removing the remaining sheets from the horizontal conveying section of the circulation conveyer 3.

Here, in the third specific example, the paper conveyance by the circulation conveyer 3 upstream of the sheet P3, which is the jammed sheet, may not be stopped immediately after the switching of the direction of the switch 6 to the paper discharge guiding direction. As mentioned above, at the circulation conveyer 3, sheets are conveyed with an interval therebetween longer than the length of a sheet. Thus, the paper conveyance upstream of the sheet P3 may be stopped for example after continuing the conveyance by the length of a sheet from the time of occurrence of the paper jam. FIG. 10 illustrates an example of this case.

Next, as a fourth specific example, description will be given of one example of the paper jam handling process performed in a case where the direction of the switch 6 is the paper discharge guiding direction at the time of occurrence of a paper jam at the paper feeder 2.

Figure 11:
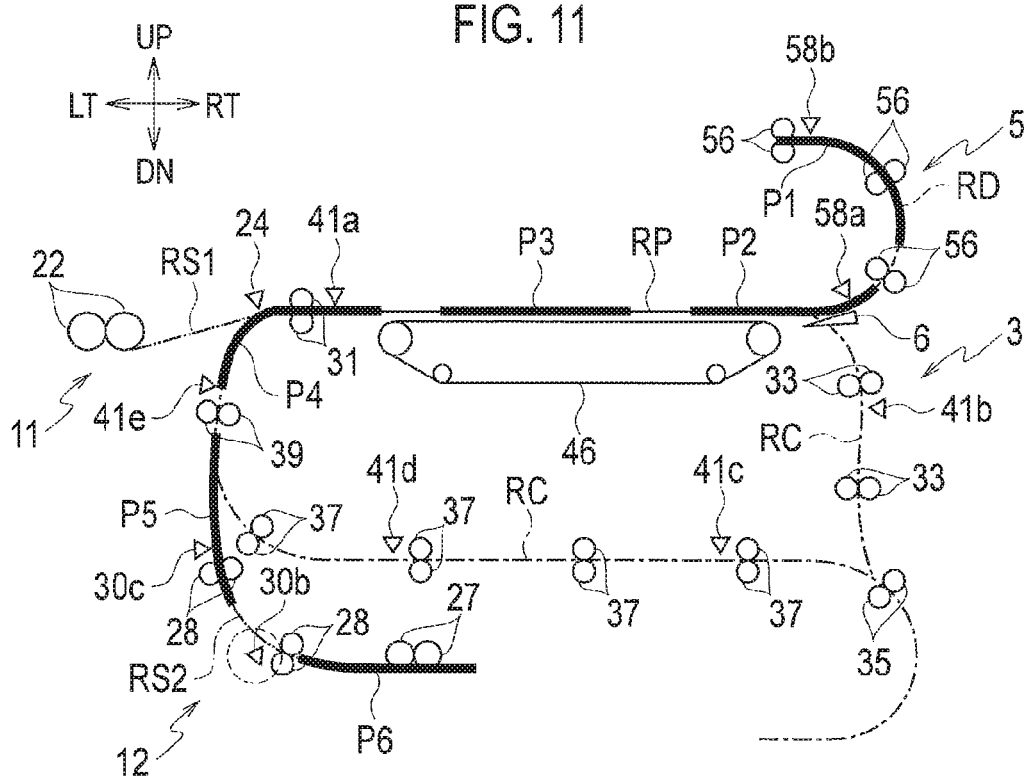
FIG. 11 is a diagram illustrating the positions of sheets at the time of occurrence of a paper jam in a fourth specific example.

FIG. 11 is a diagram illustrating the positions of sheets at the time of occurrence of the paper jam in the fourth specific example. In the example in FIG. 11, the paper jam is detected by the sheet sensor 30b during simplex printing operation involving feeding sheets from the upper internal paper feed tray 26 of the internal paper feeder 12.

In FIG. 11, sheets P1, P2, . . . are sheets to be discharged after being sequentially fed from the upper internal paper feed tray 26 of the internal paper feeder 12, printed on one side while being conveyed by the belt platen 46, and guided by the switch 6 set in the paper discharge guiding direction to the paper discharger 5.

Determining that the paper jam has occurred in the state in FIG. 11, the controller 8 stops the conveyance of the sheet P6 at the internal paper feeder 12 upstream of the sheet sensor 30b, or the position of the paper jam (Step S13 in FIG. 4).

Also, the controller 8 performs control to maintain the switch 6 in the paper discharge guiding direction and to continue the paper conveyance by the section of the internal paper feeder 12 downstream of the sheet sensor 30b (most downstream internal paper feeding conveying rollers 28), the circulation conveyer 3, the belt platen 46, and the paper discharger 5. As a result, the sheets P1 to P5 are discharged. Once the discharge of the sheets P1 to P5 finishes (Step S4 in FIG. 3: YES), the controller 8 finishes the paper conveying operation of the sections which have continued their paper conveyance (Step S5 in FIG. 3).

Figure 12:
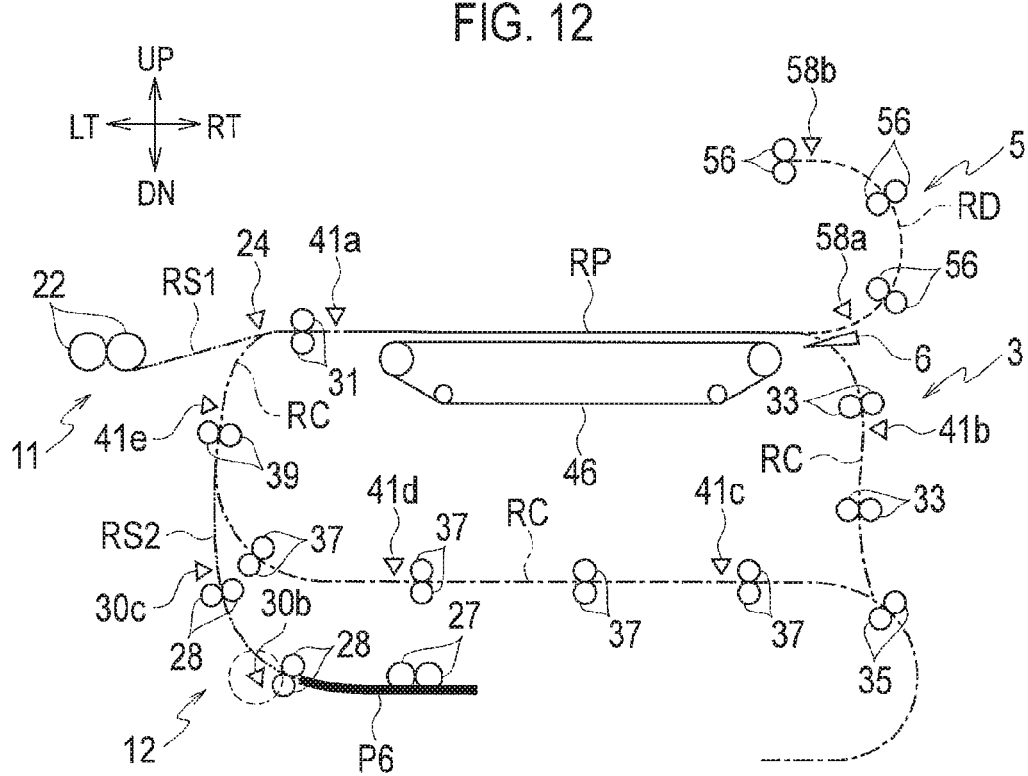
FIG. 12 is a diagram illustrating the positions of the sheets after the paper jam handling process in the fourth specific example.

As a result, the paper conveyance is stopped in a state illustrated in FIG. 12. Since the sheets P1 to P5 are discharged, the remaining sheets are reduced as compared to a case where the paper conveyance is stopped in the state in FIG. 11 at the time of occurrence of the paper jam. Also, since no remaining sheet is on the belt platen 46, the belt platen 46 does not need to be lowered for the jam releasing work.

Next, as a fifth specific example, description will be given of another example of the paper jam handling process performed in the case where the direction of the switch 6 is the paper discharge guiding direction at the time of occurrence of a paper jam at the paper feeder 2.

Figure 13:
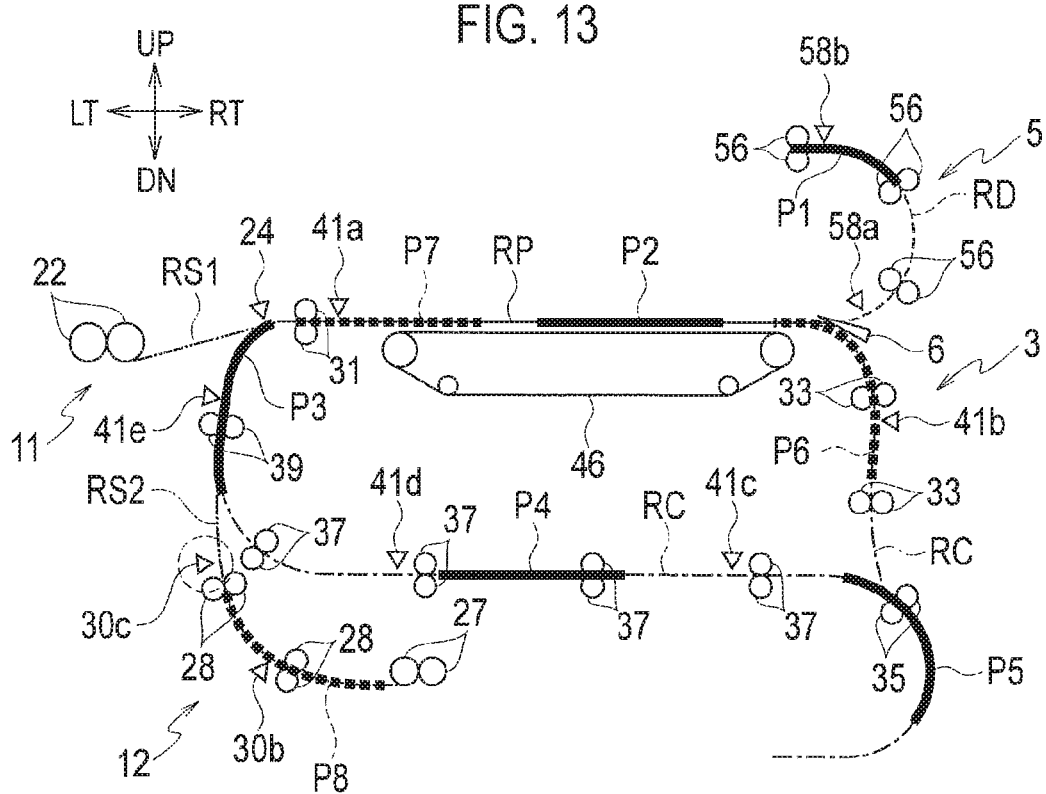
FIG. 13 is a diagram illustrating the positions of sheets at the time of occurrence of a paper jam in a fifth specific example.

FIG. 13 is a diagram illustrating the positions of sheets at the time of occurrence of the paper jam in the fifth specific example. In the example in FIG. 13, the paper jam is detected by the sheet sensor 30c during duplex printing operation involving feeding sheets from the upper internal paper feed tray 26 of the internal paper feeder 12.

In FIG. 13, as in the example in FIG. 9, sheets P1 P5 are sheets which have been sequentially fed from the internal paper feeder 12, printed on one side, and passed the switch 6 to be guided to the circulation conveyer 3. Among them, the sheet P1 has been printed on both sides and guided to the paper discharger 5 by the switch 6. A sheet P6 is a sheet fed between the sheet P1 and the sheet P2, each of which has been printed on one side, from the internal paper feeder 12. The sheet P6 has been printed on one side and is passing the switch 6 oriented in the circulation guiding direction. A sheet P7 is a sheet fed between the sheet P2 and the sheet P3, each of which has been printed on one side. A sheet P8 is a sheet to be fed between the sheet P3 and the sheet P4, each of which has been printed on one side.

Determining that the paper jam has occurred in the state in FIG. 13, the controller 8 stops the conveyance of the sheet P8 at the paper feeder 2 upstream of the sheet sensor 30c, or the position of the paper jam (Step S14 in FIG. 4). Here, in this example, the operation of the entire internal paper feeder 12 is stopped since the position of the paper jam is the position of the sheet sensor 30c situated at the most downstream section of the internal paper feeder 12.

The controller 8 continues the paper conveyance by the circulation conveyer 3, the belt platen 46, and the paper discharger 5. Then, once the trailing end of the sheet P6 exits the switch 6 (Step S15 in FIG. 4: YES), the controller 8 switches the direction of the switch 6 to the paper discharge guiding direction (Step S16 in FIG. 4). Thereafter, the controller 8 performs control to maintain the switch 6 in the paper discharge guiding direction and to continue the paper conveyance by the circulation conveyer 3, the belt platen 46, and the paper discharger 5. As a result, the sheets P1 to P7 are discharged. Once the discharge of the sheets P1 to P7 finishes (Step S4 in FIG. 3: YES), the controller 8 finishes the paper conveying operation of the sections which have continued their paper conveyance (Step S5 in FIG. 3).

Figure 14:
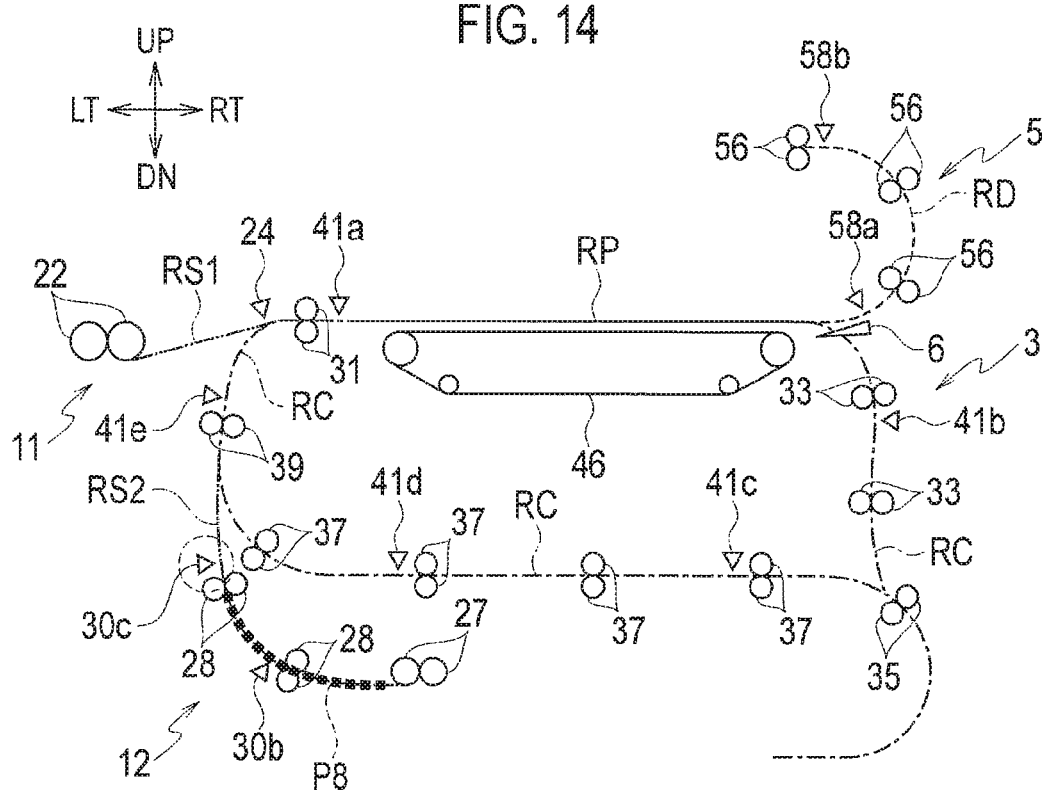
FIG. 14 is a diagram illustrating the positions of the sheets after the paper jam handling process in the fifth specific example.

As a result, the paper conveyance is stopped in a state illustrated in FIG. 14. Since the sheets P1 to P7 are discharged, the remaining sheets are reduced as compared to a case where the paper conveyance is stopped in the state in FIG. 13 at the time of occurrence of the paper jam. Also, since no remaining sheet is on the belt platen 46, the belt platen 46 does not need to be lowered for the jam releasing work.

As described above, in the printer 1, when a paper jam occurs at the circulation conveyer 3 with the direction of the switch 6 being set at the paper discharge guiding direction, the controller 8 performs control to maintain that direction and discharge the sheets P at the section of the circulation conveyer 3 downstream of the position of the paper jam, the belt platen 46, and the paper discharger 5. When the paper jam occurs at the circulation conveyer 3 with the direction of the switch 6 being set at the circulation guiding direction, the controller 8 performs control to convey the sheet P passing the switch 6 until the sheet P exits the switch 6 by means of the belt platen 46 and the circulation conveyer 3 and then switch the direction of the switch 6 to the paper discharge guiding direction and thereafter discharge the sheets P at the section of the circulation conveyer 3 downstream of the position of the paper jam, the belt platen 46, and the paper discharger 5.

Also, when a paper jam occurs at the paper feeder 2 with the direction of the switch 6 being set at the paper discharge guiding direction, the controller 8 performs control to maintain that direction and discharge the sheets P at the section of the paper feeder 2 downstream of the position of the paper jam, the circulation conveyer 3, the belt platen 46, and the paper discharger 5. When the paper jam occurs at the paper feeder 2 with the direction of the switch 6 being set at the circulation guiding direction, the controller 8 performs control to convey the sheet P passing the switch 6 until the sheet P exits the switch 6 by means of the belt platen 46 and the circulation conveyer 3 and then switch the direction of the switch 6 to the paper discharge guiding direction and thereafter discharge the sheets P at the section of the paper feeder 2 downstream of the position of the paper jam, the circulation conveyer 3, the belt platen 46, and the paper discharger 5.

In this way, in the event of a paper jam at the circulation conveyer 3 or the paper feeder 2, the remaining sheets can be reduced as compared to the case where the paper conveyance is stopped at the time of occurrence of the paper jam. Also, since no remaining sheet is on the belt platen 46, the belt platen 46 does not need to be lowered to remove remaining sheets on the belt platen 46. Thus, it is possible to leave a space for the work of removing the remaining sheets from another section, in particular, the horizontal conveying section of the circulation conveyer 3. As a result, the work of removing the remaining sheets after the occurrence of the paper jam can be facilitated.

Note that, when a paper jam occurs at the circulation conveyer 3, the controller 8 may control the circulation conveyer 3 such that the sheets P at the circulation conveyer 3 upstream of the position of the paper jam are stopped with an interval therebetween shorter than that during the normal conveyance.

Figure 15:
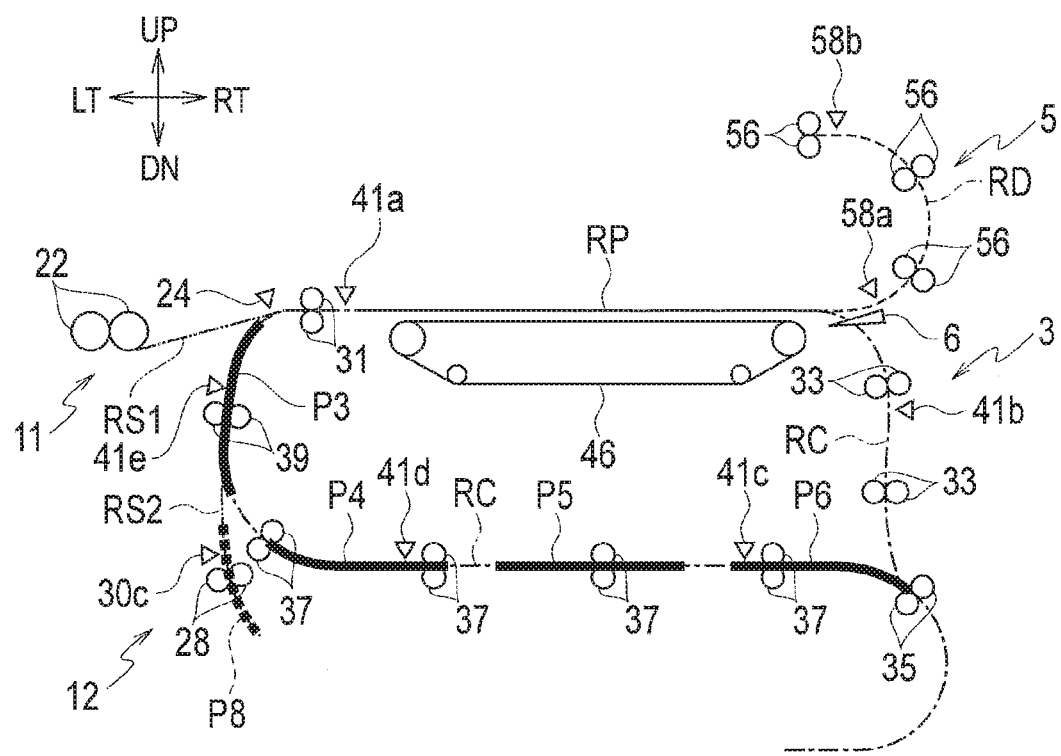
FIG. 15 is a diagram illustrating another example of the positions of the sheets after the paper jam handling process in the third specific example.

For instance, in the third specific example illustrated in FIG. 10, the interval between the sheet P3 and the sheet P4 is shorter than that during the normal conveyance, during which no jam is present, whereas the interval between the sheet P4 and the sheet P5 and the interval between sheet P5 and the sheet P6 are the same as those during the normal conveyance. However, as illustrated in FIG. 15, the controller 8 may control the circulation conveyer 3 such that the interval between the sheet P4 and the sheet P5 and the interval between sheet P5 and the sheet P6 can also be shorter than those during the normal conveyance.

In this way, the range within which the remaining sheets spread can be narrowed. As a result, the amount of work of removing the remaining sheets can be reduced further.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A printer comprising:
   a printing conveyer configured to convey a sheet in a conveying direction;
   an image former configured to form an image on the sheet being conveyed by the printing conveyer;
   a paper discharger configured to discharge the sheet from a downstream end of the printing conveyer in the conveying direction;
   a circulation conveyer configured to convey the sheet from the downstream end of the printing conveyer to an upstream end of the printing conveyer in the conveying direction;
   a switch configured to switch a switching direction between a paper discharge guiding direction and a circulation guiding direction, the paper discharge guiding direction being for the sheet to be guided from the printing conveyer to the paper discharger, the circulation guiding direction being for the sheet to be guided from the printing conveyer to the circulation conveyer; and
   a controller configured to control the printing conveyer, the image former, the paper discharger, the circulation conveyer, and the switch,
   wherein the controller, upon occurrence of a paper jam at the circulation conveyor
      upon determining that the switching direction is set at the paper discharge guiding direction, drives the switch to maintain the switching direction at the paper discharge guiding direction and drives the circulation conveyer, the printing conveyer, and the paper discharger to discharge sheets at a section of the circulation conveyer downstream of a position of the paper jam, the printing conveyer, and the paper discharger through the paper discharger, and
      upon determining that the switching direction is set at the circulation guiding direction, drives the switch to switch the switching direction to the paper discharge guiding direction after a sheet passing the switch exits the switch, and drives the circulation conveyer, the printing conveyer, and the paper discharger to discharge the sheets at the section of the circulation conveyer downstream of the position of the paper jam, the printing conveyer, and the paper discharger through the paper discharger.

2. The printer according to claim 1, wherein, upon occurrence of the paper jam at the circulation conveyer, the controller drives the circulation conveyer to stop sheets at a section of the circulation conveyer upstream of the position of the paper jam with an interval between the sheets shorter than an interval between sheets during normal conveyance.

3. The printer according to claim 2, further comprising a paper feeder configured to feed sheets to the circulation conveyer, wherein
   the controller is further configured to control the paper feeder, and the controller, upon occurrence of a paper jam at the paper feeder, upon determining that the switching direction is set at the paper discharge guiding direction, drives the switch to maintain the paper discharge guiding direction and drives the paper feeder, the circulation conveyer, the printing conveyer, and the paper discharger to discharge sheets at a section of the paper feeder downstream of a position of the paper jam, the circulation conveyer, the printing conveyer, and the paper discharger through the paper discharger, and upon determining that the switching direction is set at the circulation guiding direction, drives the switch to switch the switching direction to the paper discharge guiding direction after a sheet passing the switch exits the switch, and drives the paper feeder, the circulation conveyer, the printing conveyer, and the paper discharger to discharge the sheets at the section of the paper feeder downstream of the position of the paper jam, the circulation conveyer, the printing conveyer, and the paper discharger through the paper discharger.

4. The printer according to claim 2, wherein the controller, upon occurrence of a paper jam at the paper feeder, determines the switching direction of the switch and drives the circulation conveyor, the printing conveyor, and the paper discharger without moving a belt platen of the image former to a retracted position.

5. The printer according to claim 1, further comprising a paper feeder configured to feed sheets to the circulation conveyer, wherein the controller is further configured to control the paper feeder, and the controller, upon occurrence of a paper jam at the paper feeder, upon determining that the switching direction is set at the paper discharge guiding direction, drives the switch to maintain the paper discharge guiding direction and drives the paper feeder, the circulation conveyer, the printing conveyer, and the paper discharger to discharge sheets at a section of the paper feeder downstream of a position of the paper jam, the circulation conveyer, the printing conveyer, and the paper discharger through the paper discharger, and upon determining that the switching direction is set at the circulation guiding direction, drives the switch to switch the switching direction to the paper discharge guiding direction after a sheet passing the switch exits the switch, and drives the paper feeder, the circulation conveyer, the printing conveyer, and the paper discharger to discharge the sheets at the section of the paper feeder downstream of the position of the paper jam, the circulation conveyer, the printing conveyer, and the paper discharger through the paper discharger.

6. The printer according to claim 1, wherein the switch is positioned along a conveying direction so as to switch a direction of a sheet while the sheet is traveling in a same direction as a direction of travel of the sheet through the image former.

7. The printer according to claim 1, wherein the controller, upon occurrence of a paper jam at the paper discharger, is further configured to move a belt platen of the image former to a retracted position.

8. The printer according to claim 1, wherein the controller, upon occurrence of a paper jam at the circulation conveyor, determines the switching direction of the switch and drives the circulation conveyor, the printing conveyor, and the paper discharger without moving a belt platen of the image former to a retracted position.

\* \* \* \* \*